April 16, 1963 W. H. LYON 3,086,089

METHOD AND MEANS FOR REPRODUCING SIGNALS FROM A VERY SLOW MOVING TAPE

Filed March 11, 1959

INVENTOR.
WILLIAM H. LYON
BY
H. G. Manning
ATTORNEY 3,086,089
Patented Apr. 16, 1963

3,086,089

METHOD AND MEANS FOR REPRODUCING SIGNALS FROM A VERY SLOW MOVING TAPE

William H. Lyon, Orange, Conn., assignor to The Soundscriber Corporation, North Haven, Conn., a corporation of Connecticut Filed Mar. 11, 1959, Ser. No. 798,682
13 Claims. (Cl. 179—100.2)

This invention relates to a magnetic tape recording apparatus and is directed more particularly to a method and means for reproducing signals from a very slow moving tape.

It is well known that in the conventional magnetic tape recording and reproducing apparatus, the pick-up head output voltage in reproducing recorded signals becomes less and less as the tape speed becomes slower. At a certain point, the amplitude of the output voltage generated in the pick-up or reproducing head becomes so low that its use is impractical. Thus, while it is possible to record signals, such as pulses or sine waves on magnetic tape moving at any speed, regardless of how slow, no practical system for reproducing such signals from a very slow moving tape has heretofore been proposed.

It is accordingly the principal object of this invention to provide a novel method and means by which it is possible to reproduce usable signals from a magnetic tape moving at a very slow rate of speed.

Another object of the invention is to provide a method and means for recording signals from a very slow moving magnetic tape which will equally well reproduce signals recorded at high tape speeds.

A more particular object of the invention is to provide a recording method and means of the above nature wherein the reproducing head is mechanically oscillated at a frequency ten or more times greater than the frequency of the recorded pulses or sine waves to be reproduced from the very slow moving magnetic tape, whereby when a magnetized section of said tape passes under the oscillating reproducing head, an alternating current voltage will be generated, the instantaneous amplitude of which will be proportional to the rate of change of flux at the particular segment of the pulse or sine wave being sampled. In other words, the output of the reproducing head will be a fixed carrier voltage, the frequency of which is determined by the frequency of mechanical oscillation of the reproducing head, modulated by the magnetic information recorded on the tape With these and other objects in view, there has been illustrated on the accompanying drawing, one form in which the invention may conveniently be embodied in practice.

Figures 1, 2, 3:
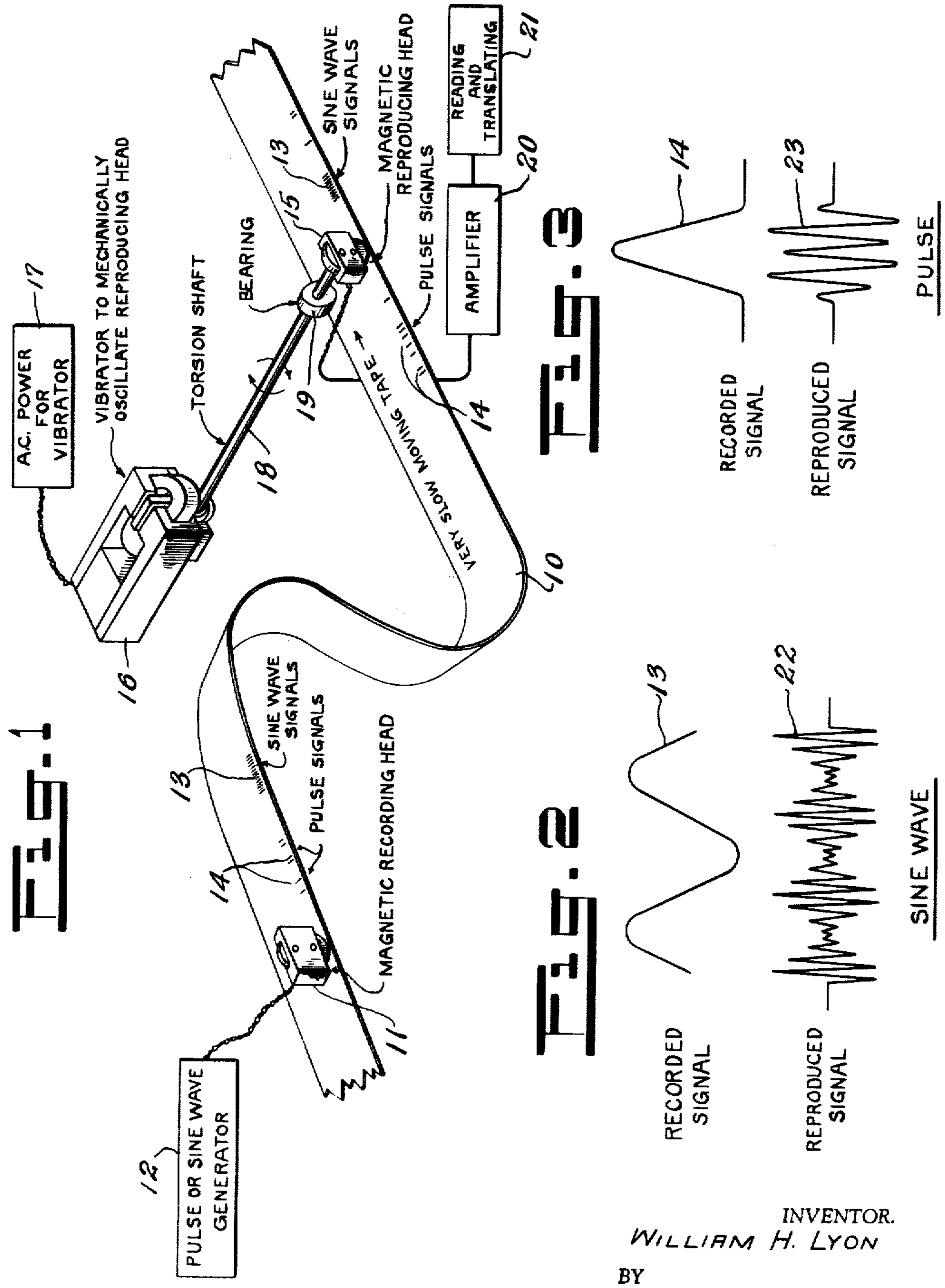
FIG. 1 is a pictorial diagram, partially in perspective, schematically illustrating the method and means for reproducing signals from a very slow moving magnetic tape according to the invention.
FIG. 2 illustrates graphically a sine wave electrical signal as recorded and as reproduced in the reproducing head of the system embodying the invention.
FIG. 3 illustrates graphically an electrical pulse signal as recorded and as reproduced in the reproducing head of the system embodying the invention.

Referring now in detail to the drawings, the reference numeral 10 in FIG. 1 designates a length of magnetic tape moving at a very slow speed, such as 3¾ inches per minute, for example, in the direction indicated by the arrow. The magnetic tape 10 first passes under a magnetic recording head 11 energized by a pulse or sine wave generator 12 operative to record sine wave signals 13 (see also FIG. 2) or pulse signals 14 (see FIG. 3), for purposes of illustration.

In accordance with this invention, a usual magnetic reproducing head 15 is employed, but is not held stationary against the moving tape in reproducing the recorded signals 13 or 14. On the contrary, the head 15 is rotatively oscillated over a small amplitude, at a frequency of 10 or more times the frequency of the recorded signal, by means of a magnetic vibrator 16 powered by an alternating current source as indicated by a block 17. To this end, the mechanical output of the vibrator 16 is coupled directly to the reproducing head 15 through a torsion shaft 18. The torsion shaft 18 is supported near its reproducing head in a bearing 19, which constrains the motion of said shaft to rotative oscillation. The output of the reproducing head 15 is fed through an amplifier 20 to a reading and translating device 21, indicated in block form.

*Operation*

In use, when the recorded sine wave signals 13 or pulse signals 14 pass the oscillating reproducing head 15, an alternating current voltage of the same frequency as that of its mechanical oscillation will be generated therein, the instantaneous amplitude of which will be proportional to the rate of change of flux of the particular segment of the sine wave or pulse signal on the tape influencing the reproducing head 15. The relatively high frequency carrier voltage thus induced by the mechanical vibration of the reproducing head 15 will be modulated by the recorded low frequency sine waves or pulse signals 13 and 14, to provide reproduced signals 22 (FIG. 2), or 23 (FIG. 3), respectively, which can readily be amplified in the amplifier 20, and demodulated in the reading and translating device 21 to reproduce the original recorded sine wave or pulse signal.

One application of the invention is in recording synchronizing pulses longitudinally along the edge of a wide, long-playing recorded tape of the type wherein recording is along spaced parallel transverse tracks, for the purpose of automatically synchronizing the pick-up heads with the tracks in accordance with pulses recorded simultaneously with the recording.

Another application could be in editing of high speed tape recordings. In this instance, synchronizing or editing pulses will be applied to the standard high speed tape during the recording process. During editing, the tape would be run in proximity to a precise point of synchronization and then moved very slowly back and forth until the chosen pulse or series of pulses became evident from the reading and translating circuit 21 associated with the oscillating reproducing head 15.

The system could also be used for extremely long time slow speed magnetic recording devices wherein it is desirable to record at 5, 10, 15 or 20 cycles per second, for example. These low frequencies can be reproduced at the same slow speed of a few feet per hour.

While I have illustrated and described herein only one form in which the invention can conveniently be embodied in practice, it is to be understood that this embodiment is given by way of example only, and not in a limiting sense. In short, the invention includes all the modifications and equivalent embodiments coming within the scope and spirit of the following claims.

Having thus fully described the invention, what is claimed as new and for which it is desired to secure Letters Patent is:

1. In an apparatus for reproducing signals from a very slow moving tape, the combination of an electrical transducer rotatably supported for contact with a magnetic tape to sense signals recorded on the tape as the tape is moved past said transducer, means for rotatively oscillating said transducer through a small amplitude at a frequency greater than the frequency of the recorded signals so as to produce an electrical output from said transducer consisting of a carrier voltage of the same frequency as the frequency of the oscillation of said transducer modulated by the signal to be reproduced, and means for demodulating said modulated carrier for electrically reproducing the recorded signal.

2. The apparatus as defined in claim 1, wherein said oscillation is in a plane extending longitudinally of said tape.

3. The apparatus as defined in claim 1, wherein said oscillating means comprises a magnetic vibrator powered by an alternating current source.

4. The apparatus as defined in claim 3, wherein said oscillating means further comprises a torsion shaft interconnecting said magnetic vibrator and said transducer, and a bearing journalling said torsion shaft near its transducer and to constrain said transducer to rotary movement.

5. In a system for reproducing signals recorded on a magnetic tape while moving said tape at a slow rate of speed such as a few feet per hour, the combination comprising, an electrical reproducing head rotatably supported with respect to the recorded signals on the moving tape, means for rotatively oscillating said reproducing head through a small amplitude at a frequency at least several times greater than the frequency of the recorded signal so as to produce an electrical output from the recording head which will consist of a carrier voltage of the same frequency as the frequency of said oscillation modulated by the signal to be reproduced, and means for demodulating said modulated carrier for electrically reproducing the recorded signal.

6. The system as defined in claim 5, wherein said oscillation is in a plane extending longitudinally of said tape.

7. The system as defined in claim 5, wherein said oscillating means comprises a magnetic vibrator powered by an alternating current source.

8. The system as defined in claim 7, wherein said oscillating means further comprises a torsion shaft interconnecting said magnetic vibrator and said reproducing head and having a bearing journalling said torsion shaft near its reproducing head end to constrain said reproducing head to rotary movement.

9. In apparatus for reproducing intelligence recorded on a record member, a pick up mechanism comprising, in combination, a transducer, a shaft connected to said transducer and rotatably supported to position said transducer for contact with said record member, and means for rotatively oscillating said shaft and said connected transducer whereby rotary movement of said transducer relative to intelligence recorded on said record member results in a modulated carrier signal from said transducer.

10. In apparatus for reproducing intelligence from a slow moving record member, a pick up mechanism comprising, in combination, a transducer, a shaft connected to said transducer and rotatably supported to position said transducer for contact with said record member, electrically powered vibrator means for rotatively oscillating said shaft and said connected transducer, about the axis of said shaft, and amplifying and detecting means for reproducing the envelope of a modulated carrier signal generated in said transducer resulting from the relative motion between said transducer and a recorded signal on the moving record member.

11. In apparatus for reproducing intelligence from a moving record member, a pick up mechanism comprising, in combination, reproducing head means for generating electrical signals in response to a recorded signal on said record member, a torsion shaft connected to said head means and rotatably supported to position said reproducing head means for contact with said record member, and electrically driven vibrating means for imparting rotary oscillation to said shaft and to said head means, whereby rotary oscillation of said shaft and said head means relative to said record member results in an output of a modulated carrier signal from said head means, said carrier signal having a frequency corresponding to the frequency of rotary oscillation and being modulated by the intelligence to be reproduced from the record member.

12. In apparatus for reproducing intelligence from a moving magnetic tape, a pick up mechanism comprising, in combination, a transducer head, amplifying and detecting means electrically connected to said head for amplification and detection of a modulated carrier signal, a torsion shaft connected to said transducer head and rotatably supported to position said transducer head in contact with said magnetic tape, and an electrically powered mechanical vibrator for imparting rotary oscillation to said torsion shaft and said transducer head, whereby vibration transmitted from said pick up mechanism to the remainder of said reproducing apparatus is kept at a minimum.

13. In apparatus for recording and reproducing intelligence with a magnetic tape, a synchronizing mechanism comprising, in combination, a transducer, a shaft connected to said transducer and rotatably supported to position said transducer for contact with said tape, and means for rotatively oscillating said shaft and said connected transducer whereby a control signal on said tape modulates a carrier signal of a frequency corresponding to the oscillation rate of said transducer.

References Cited in the file of this patent

UNITED STATES PATENTS

| | | |
|---|---|---|
| 2,587,593 | Camras | Mar. 4, 1952 |
| 2,658,950 | Canfora | Nov. 10, 1953 |
| 2,698,930 | Gutterman | Jan. 4, 1955 |
| 2,714,048 | Baird | July 26, 1955 |
| 2,822,531 | Carroll | Feb. 4, 1958 |
| 2,914,756 | Heidenhain et al. | Nov. 24, 1959 |

UNITED STATES PATENT OFFICE

CERTIFICATE OF CORRECTION

Patent No. 3,086,089 April 16, 1963

William H. Lyon

It is hereby certified that error appears in the above numbered patent requiring correction and that the said Letters Patent should read as corrected below.

Column 3, line 17, for "and" read -- end --.

Signed and sealed this 5th day of November 1963.

(SEAL)
Attest:

ERNEST W. SWIDER
Attesting Officer

EDWIN L. REYNOLDS
Acting Commissioner of Patents